Sept. 5, 1933.  E. O. MILLER  1,925,200
AUXILIARY LIGHTING SYSTEM FOR VEHICLE HEADLIGHTS
Filed Feb. 2, 1931
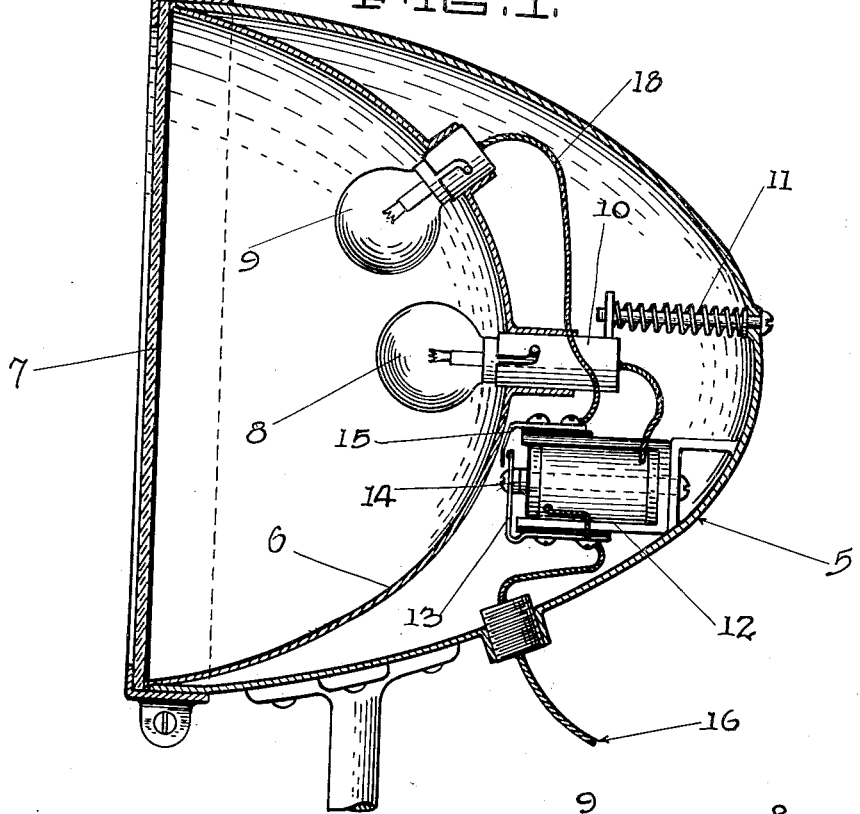
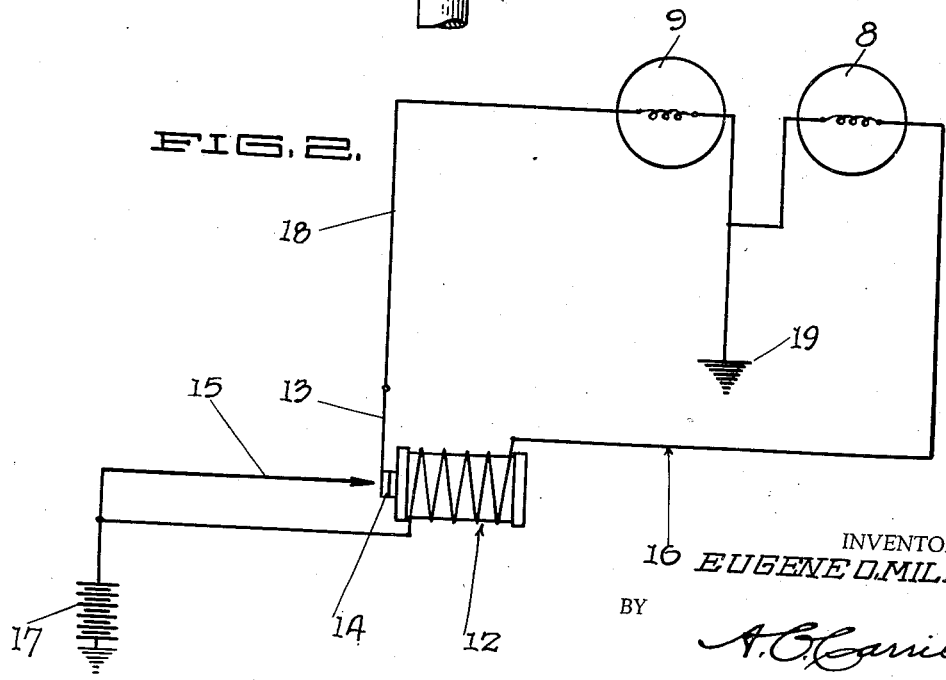
INVENTOR.
EUGENE O. MILLER
BY
ATTORNEY.

Patented Sept. 5, 1933

1,925,200

UNITED STATES PATENT OFFICE 1,925,200

AUXILIARY LIGHTING SYSTEM FOR VEHICLE HEADLIGHTS

Eugene O. Miller, San Francisco, Calif.

Application February 2, 1931. Serial No. 512,812

1 Claim. (Cl. 240—37.1)

The present invention relates generally to new and useful improvements in lighting systems for motor-vehicles and especially to auxiliary lighting means for the headlights of such vehicles in which an auxiliary light is arranged in each headlight in addition to the usual light bulb, said auxiliary light being arranged and electrically connected into the light circuit in such manner that it automatically becomes energized when the main light bulb burns out or the circuit is otherwise broken.

When the battery circuit is closed to illuminate the main bulbs of the headlights and these lights are illuminated the auxiliary lights are deenergized, but in the event that the main lights burn out or otherwise get out of order, the auxiliary lights are immediately energized and remain so energized until new main lights are inserted in place.

The above function is performed by means of an electro-magnet in the form of a relay which relay is arranged within the lamp casing in the rear of the reflector, said relay being adapted to normally cause the energization of the main light bulbs and to cause the functioning of the auxiliary lights, as above described, when the main lights become damaged or burnt out.

The primary object of the invention is to provide motor-vehicle headlights or tail-lights with auxiliary lighting means adapted, when the main lights burn out to automatically energize the auxiliary lights thereof.

Another object of the invention is to provide compact electrical means included within the lamp casings for automatically causing the functioning of the auxiliary lights when the main illuminants become deenergized.

Other objects and advantages of the invention will become apparent with reference to the subjoined specification and the accompanying one sheet of drawings in which:—

Figure 1 is a vertical sectional view of a motor-vehicle headlight showing the usual outer casing, reflector and lens, and the interiorly arranged electrical means for energizing the main light bulb and the auxiliary light bulb; and Figure 2 is a diagrammatic view illustrating the wiring system and the various elements included in the circuit for energizing the main and auxiliary lights.

Referring more particularly to the drawing in which one form of my invention is illustrated, the system comprises, in detail, the usual headlight casing 5 having a reflector 6, a lens 7, a main light bulb 8, and an auxiliary light bulb 9, all arranged within the casing outside the reflector.

The main light bulb 8 is inserted in a barrel 10 and said barrel is adjustable relative to the reflector to change the focus of said bulb through the actuation of an adjusting screw 11 in the usual manner.

The means for causing the functioning of the battery circuit to energize either the main light bulb 8 or the auxiliary light bulb 9 comprises, an electro-magnet 12 embodying a relay which is arranged in a compartment in the rear of the reflector 6, as shown in Figure 1.

The relay is provided with a spring contact 13 and an armature 14, also an auxiliary contact element 15 which is electrically connected to the auxiliary light bulb 9. As indicated in Figure 1 the relay is shown with its armature 14 in contact with a magnet core as is the normal position thereof when the main light bulb 8 is energized and the auxiliary light bulb 9 is deenergized.

Referring now more particularly to Figure 2 in which a battery circuit 16 is indicated, which circuit includes the usual batteries 17, it will be noted that the relay armature is in normal position, which position causes the auxiliary light circuit to normally remain open and the bulb 9 deenergized.

In the event that the main light bulb 8 burns out or the connections thereto become broken the relay 12 is deenergized and contact is made through the elements 15, 13 and the line 18 to the auxiliary light bulb 9, which bulb 9 remains illuminated until the bulb 8 is replaced, which again causes the relay armature to return to its normal position.

The relay 12 is a temporary magnet and when deenergized forms no part of the circuit to the auxiliary light bulb 9, but when energized the current flows through the relay 12 and said relay in this instance forms part of the circuit to the main light bulb 8.

I claim and desire to secure by Letters Patent of the United States the following:

A device of the class described, a headlight casing, a spherical reflector mounted therein and providing a compartment in the rear thereof, a main headlight and an auxiliary light mounted in said reflector, an electrical circuit therefor, and a unit mounted in the rear of said reflector and embodying an electro-magnet and a relay arranged directly below said headlight and interposed in the main circuit and adapted through the medium of the electro-magnet to complete the main light circuit.

EUGENE O. MILLER.